(12) United States Patent
Gavrilovich

(10) Patent No.: US 8,718,543 B2
(45) Date of Patent: *May 6, 2014

(54) MOBILE COMMUNICATION SYSTEM WITH MOVING BASE STATION

(71) Applicant: Carucel Investments, L.P., Davie, FL (US)

(72) Inventor: Charles D. Gavrilovich, Davie, FL (US)

(73) Assignee: Carucel Investments, L.P., Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,621

(22) Filed: May 16, 2013

(65) Prior Publication Data

US 2013/0252672 A1    Sep. 26, 2013

Related U.S. Application Data

(63) Continuation of application No. 13/154,944, filed on Jun. 7, 2011, now Pat. No. 8,463,177, which is a continuation of application No. 12/908,181, filed on Oct. 20, 2010, now Pat. No. 7,979,023, which is a continuation of application No. 11/733,069, filed on Apr. 9, 2007, now Pat. No. 7,848,701, which is a continuation of application No. 09/401,584, filed on Sep. 22, 1999, now Pat. No. 7,221,904, which is a continuation of application No. 08/953,962, filed on Oct. 20, 1997, now Pat. No. 6,026,277, which is a continuation of application No. 08/687,722, filed on Jul. 26, 1996, now Pat. No. 5,729,826, which is a continuation of application No. PCT/US95/07037, filed on Jun. 2, 1995.

(51) Int. Cl.
*H04B 7/15*    (2006.01)

(52) U.S. Cl.
USPC ........... 455/11.1; 455/13.1; 455/25; 455/561; 455/562.1; 455/101; 375/295; 375/299; 375/347

(58) Field of Classification Search
USPC ........ 455/11.1, 562.1, 465, 13.1, 25, 561, 91, 455/101; 375/346, 347, 295, 299
See application file for complete search history.

(56) References Cited

U.S. PATENT DOCUMENTS

| | | | | | |
|---|---|---|---|---|---|
| 4,539,706 | A | * | 9/1985 | Mears et al. | 455/11.1 |
| 5,260,968 | A | * | 11/1993 | Gardner et al. | 375/347 |
| 5,282,239 | A | * | 1/1994 | Yokoi et al. | 455/465 |
| 5,384,824 | A | * | 1/1995 | Alvesalo | 455/456.2 |
| 5,404,570 | A | * | 4/1995 | Charas et al. | 455/22 |
| 5,603,080 | A | * | 2/1997 | Kallander et al. | 455/14 |

* cited by examiner

*Primary Examiner* — Tuan A Tran
(74) *Attorney, Agent, or Firm* — Gavrilovich, Dodd & Lindsey, LLP; Charles D. Gavrilovich, Jr.

(57) ABSTRACT

A mobile communication system employs moving base stations moving in the direction of flow of traffic moving along a roadway. The moving base station communicates with fixed radio ports connected to a gateway office. A plurality of moving base stations are spaced apart on a closed loop and move with the flow of traffic along one roadway on one leg of the loop and with a flow of traffic on another roadway in another leg of the loop. The moving base stations communicate with a plurality of fixed radio ports connected by a signal transmission link to a gateway office which, in turn, is connected to the wire line network. The moving base stations are each provided with a pair of directional antennas with one antenna directed toward the flow of traffic and another antenna directed to the fixed radio ports.

67 Claims, 5 Drawing Sheets

MOBILE COMMUNICATION SYSTEM WITH MOVING BASE STATION

RELATED APPLICATIONS

This is a continuation of U.S. application Ser. No. 13/154,944 filed on Jun. 7, 2011, now U.S. Pat. No. 8,463,177; which is a continuation of U.S. application Ser. No. 12/908,181 filed on Oct. 20, 2010, now U.S. Pat. No. 7,979,023; which is a continuation of U.S. application Ser. No. 11/733,069 filed on Apr. 9, 2007, now U.S. Pat. No. 7,848,701 which is a continuation of U.S. application Ser. No. 09/401,584 filed on Sep. 22, 1999, now U.S. Pat. No. 7,221,904 which is a continuation of U.S. application Ser. No. 08/953,962 filed on Oct. 20, 1997, now U.S. Pat. No. 6,026,277 which is a continuation of U.S. application Ser. No. 08/687,722 filed Jul. 26, 1996, now U.S. Pat. No. 5,729,826 which is a continuation of PCT/US95/07037, filed Jun. 2, 1995 which are all incorporated by reference in their entirety, herein.

TECHNICAL FIELD

The invention relates to cellular telephone systems in which a mobile unit communicates by wireless communication to a base station connected to the wire telephone network and more particularly to cellular telephone systems adapted for use with fast-moving mobile units.

BACKGROUND

In a typical cellular telephone system, an area is divided into a plurality of cells with each cell having a centrally located cell site. A mobile unit moving in such a cellular network communicates by radio with a nearest cell site. The cell sites are each connected by cable or point-to-point microwave to a telephone network interface. The network interface typically provides communication among cell sites and between the cell sites and the so-called wire line telephone network. The functions of a typical network interface are described in The Bell System Technical Journal, January 1979, Volume 58, No. 1. One of the functions to be performed by the telephone network interface is the so-called "handoff" function. As a mobile unit moves through a cellular network, it will move away from one cell site and toward another cell site. Each cell site monitors signal quality of the signal received from the mobile unit and passes information to the telephone network interface and determines when a call in progress is to be transferred from one cell site to another. This procedure is known as "handoff". The handoff process involves several operations including selecting a cell site trunk between the MTSO and the new cell site, sending a message to the mobile unit transmitter/receiver to tune from its present voice channel to a voice channel in the new cell site corresponding to the newly selected trunk, setting up a talking path in the MTSO from the cell site trunk to the trunk of the telephone network presently in use in the call, and idling the talking path in the switching network in the MTSO between the old cell trunk and the telephone network trunk assigned to the call.

A problem with existing mobile telephone systems is the considerable time required in handoffs. This becomes a particular problem in urban areas which are highly congested. A basic principle of cellular telephone systems is the concept of frequency reuse. It can be shown that traffic capacity of a cellular system is increased by a factor $N^2$ as the size of the cell, i.e., its diameter, is decreased by a factor of N. This is due to the fact that, at least in principle, all frequencies in the mobile telephone spectrum are available for use in each independent cell. Thus, as the number of cells is increased, the total number of calls that can concurrently exist in an area is increased. A drawback, however, to decreasing the size of the cells is that a mobile unit tends to cross cell boundaries more often, requiring a larger number of handoffs which will tend to overload the mobile telephone switching office (MTSO) to the point where existing calls may be interrupted or dropped.

Personal communication service (PCS) functions in substantially the same manner as the mobile cellular system. In PCS, the user may be in a building or walking in a street or riding a vehicle and using a handset which communicates with a base station in the same manner that the mobile unit communicates with the base station or cell site in the cellular network. It is envisioned that PCS, by implementing very small cells, could provide service to a very large number of users, for example in a densely populated urban area. The difficulty with PCS is the same as in the cellular system in that handoffs become the bottleneck.

Modern cellular systems use what is known as code division multiple access (CDMA) spread-spectrum communications. In direct-sequence coding CDMA (DS-CDMA), the energy of the user signal is distributed uniformly over the system bandwidth through the spreading process providing separation between users of the same frequency in adjacent cells. A requirement of DS-CDMA is that no interfering signal received may be significantly stronger than the desired signal since it would jam the weaker signal. This type of coding is used in what is sometimes referred to as hierarchal cell structures. The most commonly referenced hierarchal structure is a macro/umbrella cell overlaying a number of micro cells. A fast-moving mobile unit, for example, may be served by the macro cell to avoid an extreme number of handovers. Slow-moving users are allocated to micro cells to save capacity for the macro cells. Using the DS-CDMA concept, micro cells and macro cells share the same frequency. To avoid strong interference at a micro cell from mobile unit in communication with a macro base station, the output power of the mobile unit in the micro cell is increased to overpower the interfering signal. The use of hierarchal cell structure to provide high-quality speech, data communication at rates up to 2 megabits per second and video communication with mobile units traveling at rates in excess of 100 miles per hour and accommodating PCS are seen as needed to meet future mobile telecommunication demands.

In the hierarchal cell structure, the low tier, small cells, e.g., on the order of 100 feet in diameter, accommodate low speeds. The low speed is mostly pedestrian traffic and other traffic moving at speeds below 30 miles per hour. The advantages of small cells include low power, simple, inexpensive and light-weight terminals. What is desirable is an infra structure which allows use of such terminals in all applications, whether in the home or office as a cordless phone, on streets, in shopping malls, airports, etc., and in cars on expressways at highway speeds. Additionally, high-spectrum reuse is needed to provide low-cost, high-quality service which requires a large bandwidth for each subscriber.

To provide wire line toll, quality-voice service, a 32-kilobit per second bit rate is required with ADPCM coders. As wireless data services emerge, even more spectrum bandwidth will be required. In the future, it may be possible to utilize the spectrum in the 60 gigahertz range providing very large amounts of bandwidth. However, the radio wave characteristics at that frequency dictate a very short range, line of site propagation, requiring very small cells. However, as noted, small cells and fast-moving mobile units are incompatible due to the time required for handoff.

SUMMARY

These and other problems of the prior art are overcome in accordance with this invention by means of a moving base station which is interposed between a moving mobile telephone unit and a fixed base station. In accordance with this invention, a movable base station moves with the traffic at a rate of speed which is comparable to the speed of the traffic and communicates with a moving mobile telephone unit via standard mobile radio transmission. The movable base station further communicates by radio signals with a plurality of fixed antennas spaced along the path of travel of the mobile base station. The several fixed antennas are connected to a telephone wire line network via a telephone gateway office in a standard fashion. In accordance with this invention, the fixed radio ports are synchronized and the interface between the moving base station and the fixed radio ports is a time division multiplexed (TDM)—direct-sequence, spread-spectrum CDMA.

In one particular embodiment, a number of fixed base stations are provided in addition to moving base stations allowing slower moving traffic, such as pedestrian traffic or rush hour mobile traffic to communicate via the fixed base stations.

In a specific embodiment of the invention, the moving base stations are provided with highly directional antennas directed to moving traffic and highly directional antennas directed to the radio ports. Communications from the fixed radio ports to the movable base stations are at a relatively low power level and from the movable base stations to the mobile units are at a relatively higher power level. Due to the characteristics of the direct-sequence, spread-spectrum CDMA, the higher power level signal will overpower the lower level signal such that the mobile unit does not receive communications from the fixed radio port but only from the movable base station. In the reverse direction, a low level of signal is transmitted from the mobile units to the movable base station and a high-level signal is transmitted from the base station to the fixed radio ports, thereby eliminating any direct communication from the mobile unit to the fixed radio port.

In one embodiment of the invention, the movable base stations are supported on a series of closed loops and ends of adjacent loops overlap to facilitate transfer of telephone cells between adjacent loops.

DETAILED DESCRIPTION

Figure 1:
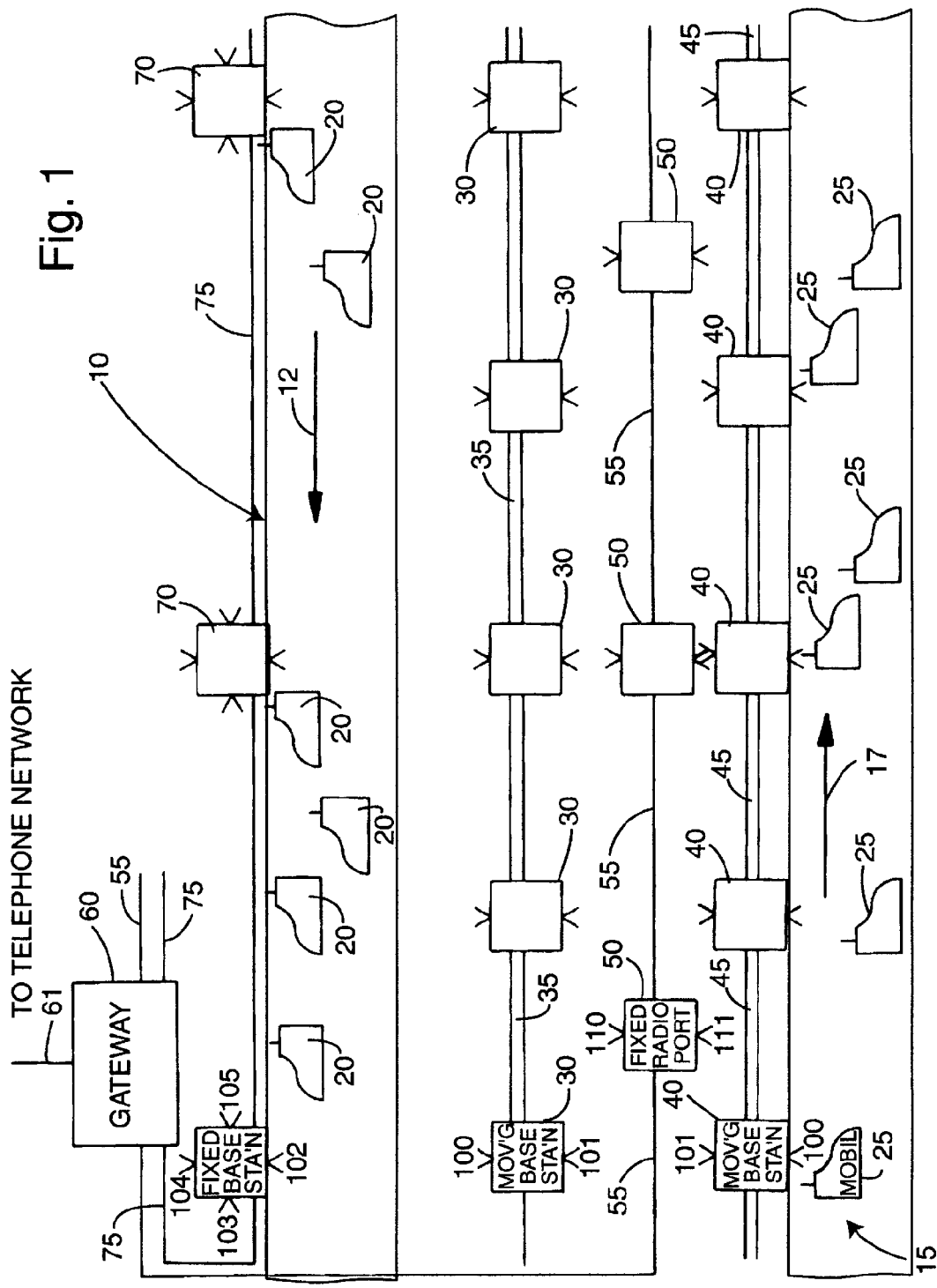
FIG. 1 is a block diagram representation of a roadway structure with fixed base stations, moving base stations, and fixed radio ports.

FIG. 1 is a diagrammatic representation of a mobile telecommunication system in accordance with one embodiment of the invention. FIG. 1 represents, for example, a divided highway with mobile units 20 traveling on a first roadway 10 in one direction and a plurality of mobile units 25 traveling along a second roadway 15, in the opposite direction. A plurality of moving base stations 30 is disposed along one side of the roadway 10. The base stations are spaced apart by a selected distance equivalent to the diameter of the cell served by the moving base station. The moving base stations 30 may be moved by means of a rail 35, or other suitable conveying device which may include an automotive vehicle traveling on the roadway, in the same direction as the traffic flow on the roadway 10, as indicated by the arrow 12. In a similar fashion, a plurality of moving base stations 40 are disposed adjacent the roadway 15 moving in the direction of the traffic as indicated by the arrow 17. The moving base stations 40 are moved along a rail 45. The moving base stations 30, 40 may be supported on any suitable conveying device such as rails 35, 45. The conveying device may be at ground level or overhead, depending on the terrain and available space for the device. The moving base stations are preferably disposed for optimum radio communication with the mobile units on the roadways.

Disposed between the moving base stations moving along the rails 35, 45 are a plurality of fixed radio ports 50 which are connected by means of a fiber optic ring 55 or a similar signal transmitting device to a telephone office connected to the wire line telephone network and referred to as a gateway office. The gateway office 60 forms the interface between the mobile telecommunication system and the wire line telephone network. The gateway office is a well-known equipment. It is part of the telephone network and is responsible for call processing in conjunction with the base stations. As described further later herein, the gateway office will include certain processor hardware and software to detect a best signal quality indication and to selectively transmit information with a best signal quality indicator to the telephone network. A plurality of fixed base stations 70 are disposed in the vicinity of the roadway 10 and are connected to the gateway office 60 by means of a fiber optic ring 75 or similar signal transmission device.

In operation, the moving base stations 30 may move in the direction of the flow of the traffic at a rate of, for example, 60 miles per hour, which may be faster than some traffic and slower than other traffic. The moving base station preferably handles telecommunications with mobile units which travel at a rate of not more than 30 miles per hour faster or slower than the moving base station. For example, the moving base stations 30, 40 may be traveling at the rate of 60 miles per hour to accommodate traffic moving in the range of 30 to 90 miles per hour. In the arrangement of FIG. 1, fixed base stations 70 would accommodate communications with mobile units traveling at a speed of less than 30 miles per hour including pedestrian traffic and stationary units. It will be readily apparent that instead of having fixed and moving base stations as depicted in FIG. 1, slowly moving and rapidly moving units may be used as well. A particular moving base station is effective when the mobile units are moving in the same direction as a base station. FIG. 1 shows two roadways traveling in opposite directions with the moving base stations disposed between moving in the direction of the traffic. The base stations may also be placed on opposite sides of the same roadway with two-way traffic with the moving base stations moving in opposite directions on the opposite sides of the roadway.

In the typical cellular telephone system, the base station, also referred to as a cell site, forms an interface between the mobile unit and the gateway office. As such, the base stations may perform a number of functions, including functions such as locating a particular mobile unit, as well as voice processing and functions associated with call setup, call supervision, and call termination. Additionally, the base stations typically perform the function of handing off and receiving an existing call involving a mobile unit which has moved into or out of the normal service area of a base station. All of these are well-known base station functions. In some proposed mobile telephone systems, the base stations are primarily only radio interface units and a base station controller, connected to a plurality of base stations performs call-handling functions for the plurality of base stations. The system in accordance with the invention differs from the prior art primarily in that the base stations 30, 40 are moving with the traffic and communicate with the gateway office 60 via fixed radio ports 50. Furthermore, in the examples described herein, the various call-handling functions, including handoff, are performed by the moving base station. Advantageously, because of movement of the base station in the same direction as the traveling mobile unit, the number of handoffs is greatly reduced.

Each of the moving base stations 30, 40 is provided with antennas 100, 101. Examples of suitable antennas for use as the antennas 100, 101, include high gain, directional antennas for use in mobile communication, and are well know and commercially available. For the example, the fixed base stations 70 are provided with four separate antennas 110 extending in four different directions. The antennas 100 on the base stations 30, 40 are used to communicate with the mobile units 20, 25 whereas the antennas 101 on the moving base stations 30, 40 are used to communicate with the fixed radio ports 50. The fixed base stations 70 are preferably each provided with four antennas 102-105. Fewer than four antennas may also be used. In such a case, at least one omni-directional antenna may be used. In the exemplary configuration of FIG. 1, the antennas 102 are arranged to communicate with the mobile units 20 and the antennas 103-105 are arranged to communicate with other mobile telephone communications from slow moving traffic or stationary subscribers. The fixed radio ports 50, in the exemplary configuration of FIG. 1, are each provided with a pair of directional antennas 110, 111 of the same general type as the directional antennas 100-105. As the moving base stations 30, 40 move relative to the fixed radio ports 50, data representing voice signals and call related information is transmitted between the antennas 101 on the moving base stations 30, 40 and the antennas 110, 111 on the fixed radio ports 50.

Figure 2:
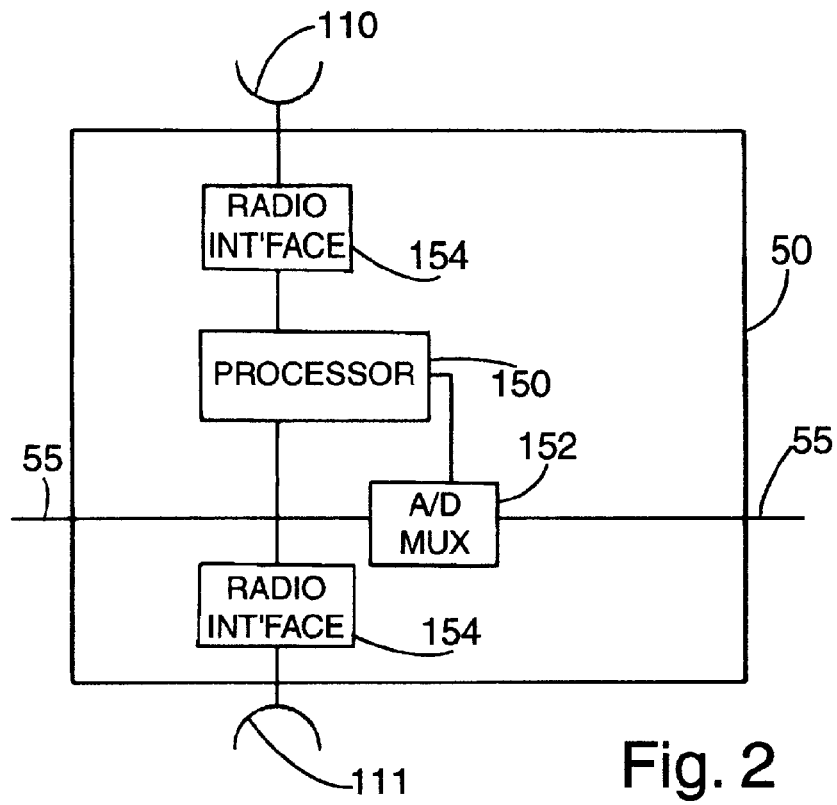
FIG. 2 is a block diagram representation of a fixed radio port of FIG. 1.

FIG. 2 is a diagrammatic representation of an example of fixed radio ports 50. In some implementations, the unit includes a standard microprocessor 150 as well as a radio interface circuit 154 providing an interface between the radio signals received on the antennas 110, 111 and the processor 150. For the example, the circuits are of a type typically used in fixed base stations and are well known in the art. Additionally, each radio port 50 includes a processor 150 connected to an add/drop multiplexer (ADM) 152 in the example discussed herein. The ADM 152 interfaces with the fiber optic cable 55 and is able to add data from the processor 150 to the data stream on the fiber optic cable 55. Additionally, the ADM 152 recognizes a data stream accompanied by an address identifying the processor 150 and transfers such data from the data stream of the fiber optic cable 55 to the processor 150. As will be described further later herein, the processor 150 computes a signal quality indicator for the information received from the radio interface circuits 154, based primarily on radio signal strength intensity, in a well-known fashion. Processor 150 controls the transfer information between the fiber optic cable 55 and the various moving base stations via the antennas 110, 111.

Figure 3:
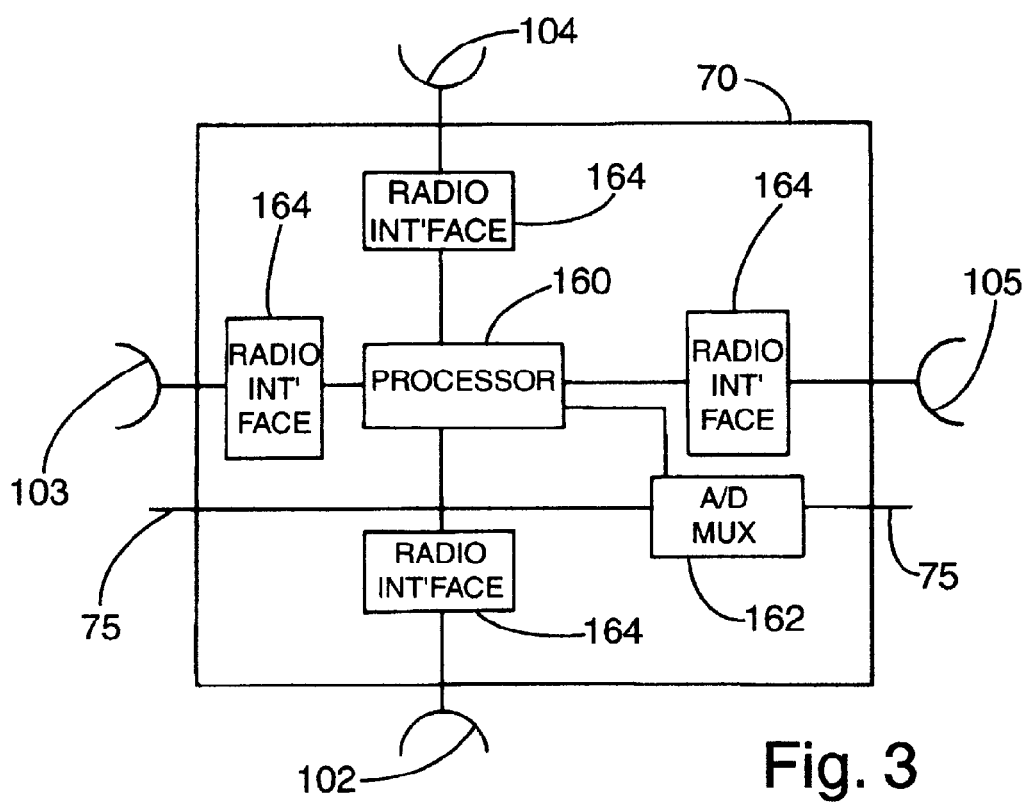
FIG. 3 is a block diagram representation of a fixed base station of FIG. 1.

FIG. 3 is a block diagram representation of an example of one of the fixed base stations 70. The fixed base stations 70 perform the functions of a standard prior art fixed base stations in the examples. The base stations 70 are connected to the fiber optic ring 75 and include an add/drop multiplexer (ADM) 162 which provides an interface between the processor 160 and the fiber optic ring 75.

As mentioned earlier, both the optical ring 55 and optical ring 75 are connected to the gateway office 60. The primary function of the gateway office is to provide the interface to a wired telephone network. It distributes the telecommunications traffic between the network and the moving base stations via the fixed radio ports. The fiber optic rings 55, 75 are preferably continuous rings with an add/drop multiplexer for each ring in the gateway office. Data transmission on the fiber optic rings 55, 75 is preferably in accordance with one of the well-known SONET or synchronous digital hierarchy (SDH) transmission protocols.

The directional antennas 100-105, 110, 111 may be of a sectorized architecture or may be phased array antennas with highly directional radio frequency beams. Such antennas are preferably used to decrease interference between the mobile base stations and the fixed radio ports, allowing greater spectrum reuse. Antenna diversity can be provided with two spatially separated radio beams separated in time with a pre-defined time-delay offset for easier separation at reception. Various techniques for obtaining high antenna diversity are well known in the art and antennas employing such techniques are commercially available. Other types of antennas may be used depending on the particular implementation.

Figure 4:
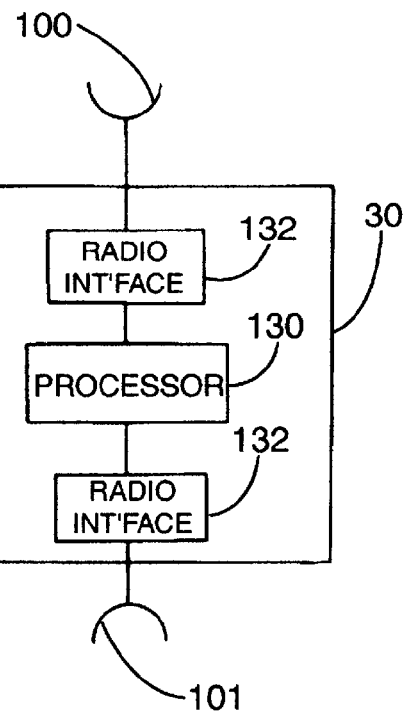
FIG. 4 is a block diagram representation of a moving base station of FIG. 1.
Figure 5:
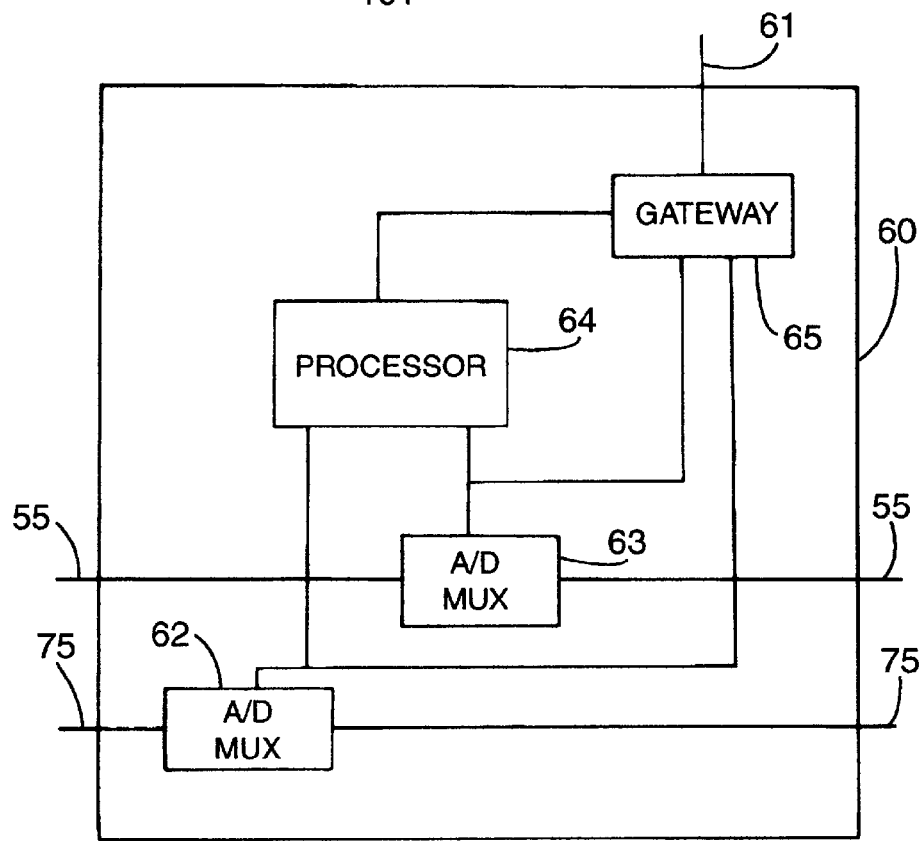
FIG. 5 is a block diagram representation of a gateway telephone office shown in FIG. 1.

FIG. 4 is a block diagram representation of an example of a moving base station 30. The station 30 includes a processor 130 connected via radio interfaces 132, 134 to the antennas 100, 101, respectively. The processor 130 may be a standard microprocessor and the radio interface circuits 132 may be standard radio interface circuits. The microprocessor is preferably programmed to handle the call processing functions performed in a prior art system by a cell site or by a shared base station controller. In this manner, the moving base station has greater autonomy and requires less communications with a shared base station controller or the like. As mentioned above, however, the base stations may be primarily only radio interface units and call processing may be performed by other equipment. The circuits 132, like the radio interface circuits 154 in the fixed radio port 50 and the radio interface circuits 164 in the fixed base station 70, are well known and commercially available circuits.

For the examples herein, the radio interface between the mobile units 20, 25 and the moving base stations 30, 40 and the fixed base station 70 is a standard radio interface, well known in the art. The radio interface between the moving base stations 30, 40 and the fixed radio ports 50 is preferably a time division multiplexed, direct-sequence, spread-spectrum, code-division multiple-access interface (TDM/CDMA). Multiple channels between the base station and the fixed radio ports are time division multiplexed as time slots in a data stream in the exemplary embodiments. The data stream is spread with a pseudo-random code over the allocated spectrum. A pilot sequence is inserted in the transmitted signal for ease of synchronization in a well-known manner. The interface between the movable base station and the fixed radio port is preferably transparent to the overall system in spectrum use.

Frequency division or time division may be used for duplex communications. In the frequency division duplex (FDD) mode, data is simultaneously transmitted in both directions, each in a different spectrum band. In a typical system in the FDD mode, the TDM frame transmission duration will be approximately 500 microseconds making the interface substantially transparent to overall system delay.

The interface between the mobile unit and the movable base may be the standard IS-95-based PCS air interface standard. The channel capacity for the so-called "extended mode" (2.5 mhz) has been determined to be seven channels at 32 kilobits per second. The FCC allocated licensed spectrum for personal communications services (PCS) includes 10-mhz licenses and 30-mhz licenses. Each 10-mhz license provides two separated 5-mhz bands and each 30-mhz license provides two separated 15-mhz bands, for two-way communications. Two 5-mhz bands can support 14 duplex channels at 32 kilobits per second and two 15-mhz bands can support 42 duplex channels at 32 kilobits per second.

Figure 6:
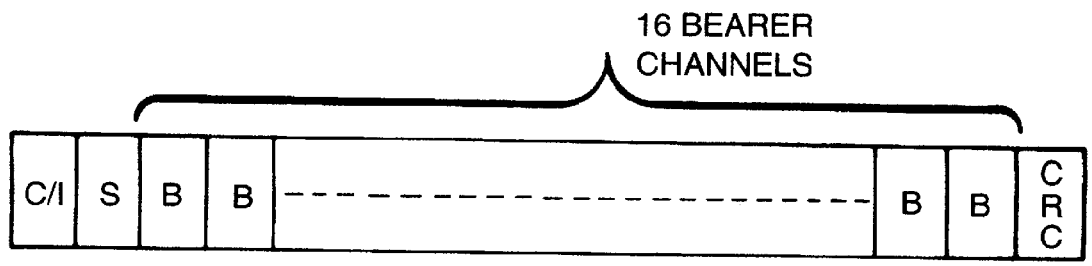
FIG. 6 is a tabular representation of channel allocation.
Figure 7:
FIG. 7 is a representation of selected channels of FIG. 6.

Voice signals between a mobile unit and the gateway office are encoded in a standard fashion using ADPCM voice encoding with a minimum bit rate of 32 kilobits per second in each channel. The interface between the moving base station and the fixed radio port is adapted to carry up to 19 channels of 32 kilobits per second each at 16 bits per time slot. The frame structure includes 16 bearer channels of 32 kilobits per second at 16 bits per time slot. The time division multiplexed frame rate between the movable base station and the fixed radio port is 608 kilobits per second. To achieve a processing gain of 9 decibels, the frame rate is multiplied by a factor of 8, yielding 4,864 kilobits per second, which fit into a single 5-mhz band. FIG. 6 is a tabular representation of the channel allocation showing 16 bearer channels plus 3 channels for signaling, control, and error code. FIG. 7 is a representation of channels 18 and 19 of FIG. 6.

The moving base stations are addressed using predefined code sequences derived in a known manner by the use of Walsh functions. U.S. Pat. No. 5,103,459 entitled "System and Method for Generating Signal Wave Forms in CDMA Cellular Telephone System" describes the use of Walsh functions for code generation. U.S. Pat. No. 5,103,459 is incorporated by reference herein. As described in that patent, by choosing a Walsh function of order 8 provides 8 orthogonal codes in the present embodiment using spread spectrum CDMA uses the all 0 Walsh sequence as a pilot carrier with the other 7 sequences available for moving base station communications. The code sequences may be repeated as ABCDEFG; ABCDEFG; .... Although fewer codes could be used, preferably no less than 3 are used. Because of differing propagation times for signals between a particular moving base station and two or more different fixed radio ports, it is not possible to satisfy the condition of time alignment required for Walsh function orthogonality for 2 or more fixed radio ports at one time. For this purpose, two outer pseudonoise codes are used to provide discrimination between signals arriving at the moving base station from different fixed radio ports. The pseudonoise code rate is preferably 4,864 kilobits per second. The sequence length for the transmitted carrier signal is preferably 32,768 chips, as described in U.S. Pat. No. 5,103,459. The outer pseudonoise codes modulate the signal in quadrature phase shift keying.

The pilot signal will be transmitted in both directions, from the moving base stations to the fixed radio ports and vice, versa. This is made possible by the line of site fading characterized as Rician.

The pilot sequence will be long enough that a number of different sequences can be generated by shifts in the basic sequence. The separation will be great enough to ensure that there is no interference between pilot signals. Each moving base stations will use a different offset from a neighboring moving base station to provide signal separation. Similarly, each fixed radio port will use a different offset from a neighboring fixed radio port.

The FCC has allocated a 20 mhz of unlicensed spectrum, including a 10 mhz band for voice products and a 10-mhz band for data products. Thus, one continuous 10-megahertz channel is available and time division multiplex transmission is preferably used. The bit rate for both directions of transmission will be twice the frequency division duplex rate, introducing an overall delay of 500 microseconds and a processing gain of 9 decibels. In the time division duplex mode, the transmission times and direction, forward and reverse between the mobile unit and the moving base station and between the moving base station and the fixed radio ports, are aligned. In one half of the time division, duplex cycle signals are transmitted from the mobile unit to the moving base station and, from there, to the fixed radio port. In the other half-cycle, signals are transmitted from the fixed radio port to the moving base station and then to the mobile unit.

The two 15-mhz licensed spectrum bands (30 mhz) are preferably divided into three 5-megahertz channels in each direction, utilizing the same architecture as described earlier herein with respect to the 5-megahertz licensed spectrum. In the 15-mhz licensed spectrum, each of the 5-megahertz channels will support 14 traffic channels, for a total of 42 traffic channels in each 15-mhz band. The air interface between the moving base station and the fixed radio port, as well as the signal structure, can be modified and adapted to a variety of allocations of spectrum and air interface standards.

In the present embodiment, as described earlier herein, 7 orthogonal codes are available for communication between the fixed radio ports 50 and the moving base stations 30, 40. As described earlier herein and depicted in FIGS. 6 and 7, one 16 bit communication channel, channel 19, is set aside for control and identification bits. As depicted in FIG. 7, channel 19 may comprise 7 control bits and 9 identification bits. The 9 identification bits provide 512 unique identification numbers. Using 7 orthogonal codes and 512 identification numbers, 3,854 moving base stations can be uniquely identified. When the moving base stations are separated by a spacing of 200 feet, the total distance of coverage using the 3,854 moving base stations is approximately 135 miles. FIG. 1 shows a portion of the system with moving base stations moving in opposite directions along oppositely directed roadways and fixed radio ports with dual antennas. Vehicular traffic moving in opposite directions on the same roadway are preferably served by moving base stations on opposite sides of the roadway. Where each roadway has only one-way traffic, the system is preferably disposed between the roadways. In one embodiment of the invention, depicted in FIG. 9, two separate loops 200, 205 are disposed between two separate roadways 206, 208 with the traffic on the roadways indicated by the arrows 207 and 209. The loops 200 and 205 comprise moving base stations 210 and 250, respectively. The base stations, in this embodiment, are moving in the direction indicated by the arrows 201 and 202. Since, as a practical matter, the loops 200, 205 are not of indefinite length, a plurality of loops may be required to cover a desired area. To avoid interruption in communications, the ends of the loops are preferably sufficiently close together, or overlapping, to provide an overlapping area of coverage for mobile units traveling in the area of the loop ends. This will allow one of the mobile stations nearing the end of the loop of which it is a part to hand off the call to a mobile station of the adjacent loop.

Figure 9:
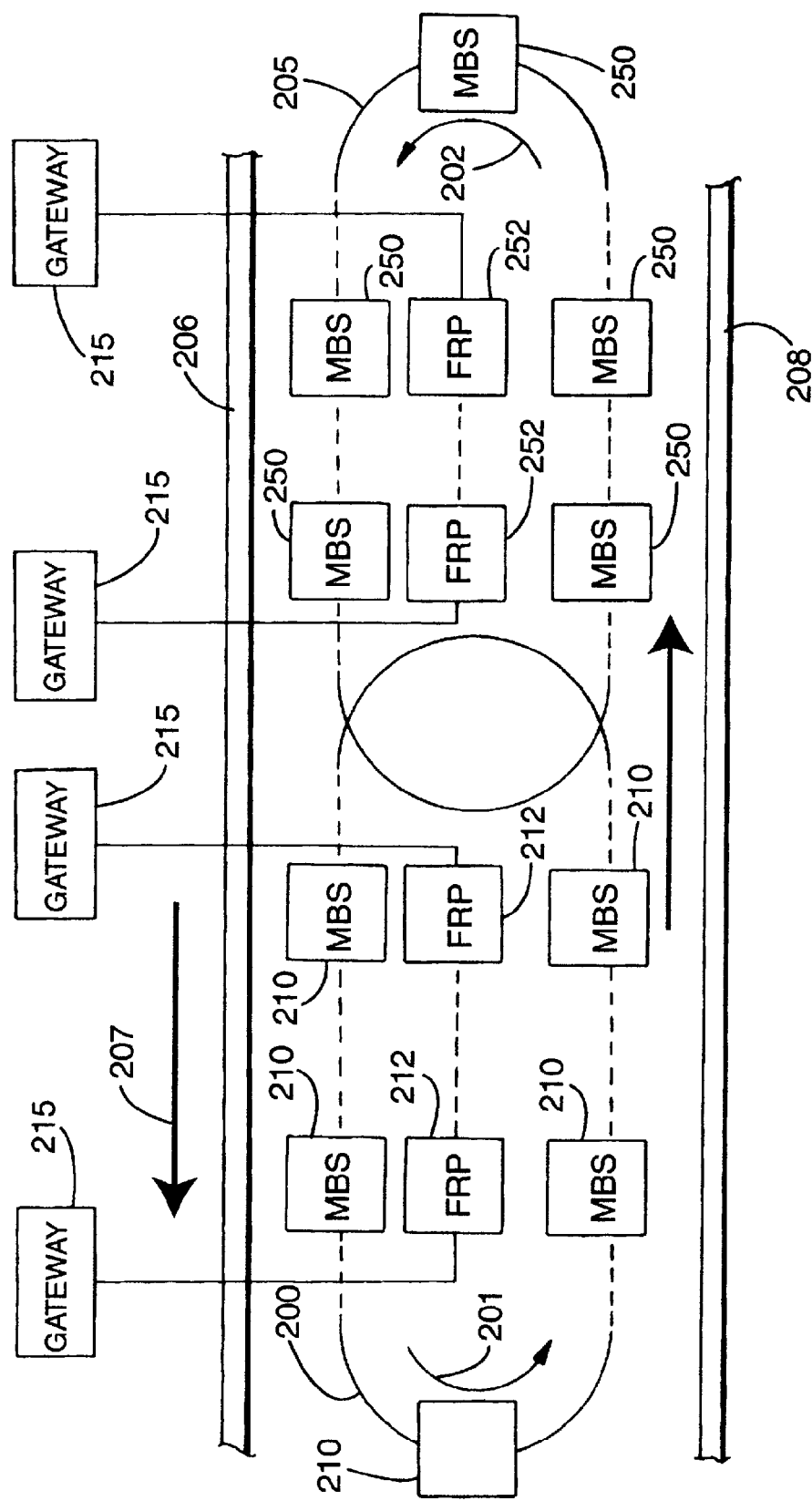
FIG. 9 is a block diagram representation of moving base stations operating in separate loops.

Each loop preferably has a single gateway for connection to the wire telephone network. One advantage of that arrangement is that it eliminates the need for registration of moving base stations, which is required where a moving base station moves between gateways. FIG. 9 shows a pair of gateways 215 associated with the loop 200 and a pair of gateways 255 associated with the loop 205. The two gateways of a loop are both connected to the fixed radio ports of the loop at all times and may be operated in a load sharing mode with each capable of handling the total telecommunication's traffic for the loop in the event of a failure in one of the gateways.

To avoid interrupting communications with a mobile unit traveling along the roadway in the area where two adjacent loops end, any existing calls are handed off from the moving base station near the terminating end of its loop to a moving base station of the next loop. The handoff process is essentially the same as a handoff between moving base stations on the same loop, except that the handed off call will be routed to the wire network to a different gateway. This procedure is equivalent to a handoff between cell sites of different cells in the existing cellular network in a manner which is well known in the art. The loops 200 and 205 may physically overlap to assure proper overlap of communications between moving base stations of the two loops and to avoid loss of communication with a mobile unit handed off from one loop to another.

The timing and synchronization between the moving base station and a fixed radio port with which the moving base station communicates is phase-locked to the pilot signals received from the fixed radio port with which the moving base station communicates. For synchronization purposes, the moving base station will receive a Global Positioning Satellite (GPS) Coordinated Universal Time (UCT) timing signal once each second.

Figure 8:
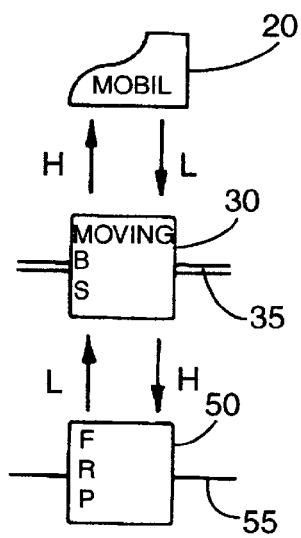
FIG. 8 illustrates signal transmission among the various system entities.

CDMA Technology is well-known for sensitivity to power control. Specifically, the more powerful signals tend to "mask out" less powerful signals at the receiver. Typically, elaborate power control schemes are implemented to ensure that all signals arrive at the receiver at the same level. In accordance with the system of this invention, however, the sensitivity to power level of CDMA is used to advantage. The principles of signal transmission employed in the system of the invention is illustrated in FIG. 8. Two power levels of radio transmission, high (H) and low (L), are defined. Referring to FIG. 1, high-power level signals are transmitted from the moving base station 30 to the mobile unit 20 and from the base station 30 to the fixed radio port 50. Low power level signals are transmitted from the fixed radio port 50 to the moving base station 30. Similarly, low power signals are transmitted from the mobile unit 20 to the moving base station 30. Since the moving base station receives a low power level signal from the fixed radio port and transmits a high level power signal toward terminals, the high power level received at the mobile unit 20 will mask out any signals of the low power signal transmitted from the fixed radio port to the moving base station. In a similar fashion, any low signal transmitted from the mobile unit 20 reaching the fixed radio port 50 will be masked by the high power level signal transmitted from the moving base station to the fixed radio port. As stated earlier, the antennas 100-105, 110, 111 are preferably highly directional antennas with very little feedback from the transmit signal to the receive signal. Feedback due to reflections and other extraneous sources can be readily eliminated at the moving base station using well-known noise cancellation techniques.

When a mobile unit set is first powered up or first enters a service area, the mobile unit must register in the manner described earlier, by transmitting its unique address in the new service area. The address will be received by the closest moving base station 30 and transmitted via a fixed radio port and the gateway switch 60 to the telephone network. This registration procedure is required so that an incoming call for the mobile unit can be appropriately directed.

The spacing of mobile based stations 20 and the fixed radio ports 50 of FIG. 1, together with the strength of the signal transmitted between the moving base stations and the fixed radio ports, determines the number of fixed radio ports with which a moving base station can communicate at any point in time. The spacing and signal strength is preferably such that each fixed radio port receives signals from three moving base stations. When a fixed radio port receives data, accompanied by the identification number of the moving base station, the processor 150 (FIG. 2) computes a signal quality indication on the received signal. The signal quality indication is a figure of merit preferably computed as a function of signal strength and signal-to-noise ratio. It is added to the received data and added to the fiber optic ring 55 via the ADM 152. The gateway 60 preferably receives the same data from several different ones of the fixed radio ports 50 and stores the data in an internal memory in the gateway 60 in association with the moving base station identification number and Walsh function spreading code. The address of the fixed radio port from which the data has been received is stored in the memory of processor 64 as well. Accordingly, multiple copies of the same data transmitted by a single moving base station are stored in the memory of the processor 64 in the gateway. The signal quality indications computed by the processors 150 in each of several fixed radio ports are compared to a predefined signal quality indication threshold, and the data corresponding to a signal quality indication below the threshold value is discarded. Otherwise, the data is retained. A cyclic redundancy code transmitted with the data is used to detect any TDM frame errors. The best data, i.e., associated with the best signal quality indication is transferred from the gateway 60 to the telephone network. Data received from the telephone network at the gateway 60 and intended for a registered mobile unit is stored in the memory of the processor 150 in a register particularly associated with the moving base station currently serving the mobile unit. This data will be sent via the optical ring 55 to all fixed radio ports that are identified in the memory of the processor 65 as fixed radio ports with an acceptable signal quality indication. The received data will be transmitted from each of the fixed radio ports which received the data together with the identification code and Walsh function code of the moving base station to which the data is directed. The transmission of data from different fixed radio ports will be staggered, delayed by different amounts, so that they can be received and separated at the moving base stations. The delays can be precisely controlled by means of synchronous distribution via the optical ring 55, in the SONET or SDH format. The receiving moving base station, by means of its processor 130, compares the multiple copies of the received data signals, aligns them and combines them for the best reception.

Each of the moving base stations will have one of N assigned codes, where N may be any number, but preferably is at least 3 or more. Seven Walsh function codes are preferably used. The codes may be repeated in sequence, as for example, ABCDEFGABCDEFG. The codes are assigned in sequence to the various moving base stations so that two moving base stations having the same code will be physically separated by a sufficient distance to prevent interference in the communications between fixed radio ports and moving base stations having the same identity code. The operation of the fixed base stations 70 is essentially the same as that of a standard fixed base station. In congested traffic areas, a mobile unit which is stopped or slowly moving, e.g., less than 30 miles per hour, will preferably be serviced by one of the fixed base stations 70. As the speed of travel of the mobile unit 20 increases, a handoff will occur between the fixed base station and a moving base station. The procedures for determining whether a mobile unit is to be served by a fixed base station or a moving base station are the same procedures as described earlier herein in determining which moving base station is selected to serve a mobile unit, i.e., based on signal strength and error rate. Thus, when a call involving a mobile unit is initiated or when it is determined that a handoff should occur, the mobile unit may be handed from a moving station to a fixed station, or vice versa. Each mobile unit monitors pilot signals from fixed and moving base stations and synchronizes to the base station providing the best signal. The mobile unit may "connect" with three fixed or moving base stations while searching for a fourth in what is known as the "soft" hand-off mode. As the speed of the vehicle increases, fixed or slow moving base stations will be dropped. In more congested areas where traffic speed will vary between 0 and 60 miles per hour, base stations speed may, for example, be set to move at 30 mph. The moving base station should then be able to accommodate all traffic in the 0-60 mph range.

It will be understood that the above-described arrangement is merely illustrative of the application of the principles of the invention and that other arrangements may be devised by those skilled in the art without departing from the scope of the invention as defined by the appended claims.

What is claimed is:

1. An apparatus comprising:
   a plurality of spatially separated antennas;
   a receiver configured to receive a mobile device signal from a mobile device moving relative to Earth; and
   a transmitter configured to transmit, through the plurality of spatially separated antennas, a cellular signal including data extracted from the mobile device signal, the transmitter configured to transmit the cellular signal to a base station radio interface circuit while the apparatus is moving relative to the base station interface circuit and relative to Earth.

2. The apparatus in accordance with claim 1, wherein the transmitter is configured to transmit the cellular signal to the base station radio interface circuit while the apparatus is on an overhead vehicle moving relative to the base station interface circuit and relative to Earth.

3. An apparatus in accordance with claim 1, wherein the transmitter is configured to transmit the cellular signal while the apparatus is moving in the same direction that the mobile device is moving.

4. An apparatus in accordance with claim 1, wherein the cellular signal is a code division multiple access (CDMA) signal.

5. An apparatus in accordance with claim 1, wherein the plurality of spatially separated antennas is configured as directional antenna sectors.

6. An apparatus in accordance with claim 1, wherein the plurality of spatially separated antennas is configured as a plurality of phased array antennas with directional radio frequency beams.

7. An apparatus in accordance with claim 1, further comprising another plurality of spatially separated antennas, the receiver configured to receive the mobile device signal through the another plurality of spatially separated antennas.

8. An apparatus in accordance with claim 7, wherein the plurality of spatially separated antennas is configured to transmit spatially separated radio frequency beams separated in time with a predefined time delay.

9. An apparatus in accordance with claim 1, the transmitter further configured to transmit the cellular signal at a cellular transmission power level higher than a mobile device transmission power level at which the mobile device signal is transmitted.

10. An apparatus comprising:
    a plurality of spatially separated antennas;
    a receiver configured to receive, through the plurality of spatially separated antennas, a plurality of cellular signals from a plurality of base station interface circuits; and
    a transmitter configured to transmit a mobile device radio frequency signal to a mobile device moving relative to Earth while the apparatus is moving relative to the plurality of base station radio interface circuits and relative to Earth, the mobile device radio frequency signal including data extracted from the cellular signals.

11. An apparatus in accordance with claim 10, wherein the transmitter is configured to transmit the mobile device radio frequency signal while the apparatus is on an overhead vehicle moving relative to the plurality of base station radio interface circuits and relative to Earth.

12. An apparatus in accordance with claim 10, wherein each cellular signal includes the data.

13. An apparatus in accordance with claim 10, wherein the plurality of cellular signals is a plurality of code division multiple access (CDMA) signals.

14. An apparatus in accordance with claim 10, wherein the plurality of spatially separated antennas is configured as directional antenna sectors.

15. An apparatus in accordance with claim 10, wherein the plurality of spatially separated antennas is configured as a plurality of phased array antennas with directional radio frequency beams.

16. An apparatus in accordance with claim 10, further comprising another plurality of spatially separated antennas, the transmitter configured to transmit the mobile device radio frequency signal through the another plurality of spatially separated antennas.

17. An apparatus in accordance with claim 16, wherein the another plurality of spatially separated antennas is configured to transmit spatially separated radio frequency beams separated in time with a predefined time delay.

18. An apparatus in accordance with claim 10, further comprising a controller configured to align and combine the plurality of cellular signals.

19. An apparatus in accordance with claim 10, the transmitter further configured to transmit the mobile device radio frequency signal within time slots of time-division multiplex channels.

20. An apparatus in accordance with claim 10, wherein the transmitter is configured to transmit the mobile device radio frequency signal while the apparatus is moving in the same direction that the mobile device is moving.

21. An apparatus comprising:
    a plurality of spatially separated antennas;
    a first receiver configured to receive, through the plurality of spatially separated antennas, a cellular signal transmitted from a base station radio interface circuit;
    a first transmitter configured to transmit a mobile device signal to a mobile device moving relative to Earth while the apparatus is moving relative to the base station radio interface circuit and in the same direction as the mobile device, the mobile device signal including data extracted from the cellular signal;

a second receiver configured to receive another mobile device signal transmitted from the mobile device; and a second transmitter configured to transmit, using at least one of the plurality of spatially separated antennas, another cellular signal to the base station radio interface circuit while the apparatus is moving relative to the base station radio interface circuit and relative to Earth, the another cellular signal including other data extracted from the another mobile device signal.

22. An apparatus in accordance with claim 21, wherein the first transmitter is configured to transmit the mobile device signal and the second transmitter is configured to transmit the another cellular signal while the apparatus is on an overhead vehicle moving relative to the base station radio interface circuit and relative to Earth.

23. An apparatus in accordance with claim 21, wherein the second transmitter is further configured to transmit the another cellular signal at a cellular transmission power level higher than a mobile device transmission power level at which the another mobile device signal is transmitted.

24. An apparatus in accordance claim 21, wherein the second transmitter is further configured to transmit the another cellular signal using at least two of the plurality of spatially separated antennas.

25. An apparatus in accordance with claim 21, wherein the cellular signal is a code division multiple access (CDMA) signal.

26. An apparatus in accordance with claim 21, the second transmitter further configured to transmit the cellular signal at a cellular transmission power level higher than a mobile device transmission power level at which the another mobile device signal is transmitted.

27. An apparatus comprising:
a first plurality of spatially separated antennas;
a second plurality of spatially separated antennas;
a first receiver configured to receive, through the first plurality of spatially separated antennas, a first plurality of cellular signals transmitted from a plurality of base station radio interface circuits;
a first transmitter configured to transmit, through the second plurality of spatially separated antennas, a first plurality of mobile device signals including first data extracted from the first plurality of cellular signals, the first transmitter configured to transmit the first plurality of mobile device signals to a mobile device moving relative to Earth while the apparatus is moving relative to the base station radio interface circuits and in the same direction as the mobile device;
a second receiver configured to receive, through the second plurality of spatially separated antennas, a second plurality of mobile device signals transmitted from the mobile device; and
a second transmitter configured to transmit, through the first plurality of spatially separated antennas, a second plurality of cellular signals including second data extracted from the second plurality of mobile device signals, the second transmitter configured to transmit the second plurality of cellular signals to the plurality of base station radio interface circuits while the apparatus is moving relative to the base station and relative to Earth.

28. An apparatus in accordance with claim 27, wherein the first plurality of cellular signals and the second plurality of cellular signals are code division multiple access (CDMA) signals.

29. An apparatus in accordance with claim 28, the second transmitter further configured to transmit the second plurality of cellular signals at a cellular transmission power level higher than a mobile device transmission power level at which the second plurality of mobile device signals are transmitted.

30. An apparatus comprising:
a plurality of spatially separated antennas;
a first receiver configured to receive, through the plurality of spatially separated antennas, a first plurality of cellular signals transmitted from a plurality of base station radio interface circuits;
a first transmitter configured to transmit a first mobile device signal including first data extracted from the first plurality of cellular signals, the first transmitter configured to transmit the first mobile device signal to a mobile device moving relative to Earth while the apparatus is moving relative to the base station radio interface circuits, the mobile device moving relative to Earth while the apparatus is moving in the same direction that the mobile device is moving;
a second receiver configured to receive a second mobile device signal transmitted from the mobile device; and
a second transmitter configured to transmit, through the plurality of spatially separated antennas, a second plurality of cellular signals including second data extracted from the second mobile device signal, the second transmitter configured to transmit the second plurality of cellular signals to the plurality of base station radio interface circuits while the apparatus is moving relative to the base station radio interface circuits and to Earth.

31. An apparatus in accordance with claim 30, wherein the first transmitter is configured to transmit the first mobile device signal and the second transmitter configured to transmit the second plurality of cellular signals while the apparatus is on an overhead vehicle moving relative to the base station radio interface circuits and relative to Earth.

32. An apparatus in accordance with claim 30, wherein the first plurality of cellular signals and the second plurality of cellular signals are code division multiple access (CDMA) signals.

33. An apparatus in accordance with claim 30, the second transmitter further configured to transmit the second plurality of cellular signals at a cellular transmission power level higher than a mobile device transmission power level of the second mobile device signal.

34. An apparatus comprising:
a plurality of spatially separated antennas;
a first radio interface circuit configured to receive, through the plurality of spatially separated antennas, a first plurality of code division multiple access (CDMA) cellular signals transmitted from a plurality of base station radio interface circuits and configured to transmit, at a cellular transmission power level, a second plurality of CDMA cellular signals to the plurality of base station radio interface circuits; and
a second radio interface circuit configured to transmit a first mobile device signal including first data extracted from the first plurality of CDMA cellular signals, the second radio interface circuit configured to transmit the first mobile device signal to a mobile device and configured to receive a second mobile device signal transmitted from the mobile device at a mobile device transmission power level less than the cellular transmission power level,
the second plurality of CDMA cellular signals including second data extracted from the second mobile device signal, the mobile device moving relative to Earth while the apparatus is moving relative to the base station radio interface circuits, and the mobile device moving relative to Earth while the apparatus is moving in the same direction that the mobile device is moving.

35. An apparatus in accordance with claim 34, wherein:

the first radio interface circuit is configured to receive CDMA cellular signals and transmit the second plurality of CDMA cellular signals while the apparatus is on an overhead vehicle moving relative to the base station radio interface circuits and relative to Earth and while the overhead vehicle is moving in the same direction that the mobile device is moving; and the second radio interface circuit is configured to transmit the first mobile device signal and to receive the second mobile device signal while the apparatus is on an overhead vehicle moving relative to the base station radio interface circuits and relative to Earth and while the overhead vehicle is moving in the same direction that the mobile device is moving.

36. An apparatus comprising:

a plurality of spatially separated antennas;

a receiver configured to receive a mobile device signal from a mobile device moving relative to Earth; and a transmitter configured to transmit, through the plurality of spatially separated antennas, a cellular signal including data extracted from the mobile device signal, the transmitter configured to transmit the cellular signal to a base station radio interface circuit while the apparatus is on a vehicle moving relative to the base station interface circuit and relative to Earth.

37. An apparatus in accordance with claim 36, wherein the transmitter is configured to transmit the cellular signal while the apparatus is moving in the same direction that the mobile device is moving.

38. An apparatus in accordance with claim 36, wherein the cellular signal is a code division multiple access (CDMA) signal.

39. An apparatus in accordance with claim 36, wherein the plurality of spatially separated antennas is configured as directional antenna sectors.

40. An apparatus in accordance with claim 36, wherein the plurality of spatially separated antennas is configured as a plurality of phased array antennas with directional radio frequency beams.

41. An apparatus in accordance with claim 36, further comprising another plurality of spatially separated antennas, the receiver configured to receive the mobile device signal through the another plurality of spatially separated antennas.

42. An apparatus in accordance with claim 36, wherein the plurality of spatially separated antennas is configured to transmit spatially separated radio frequency beams separated in time with a predefined time delay.

43. An apparatus in accordance with claim 36, the transmitter further configured to transmit the cellular signal at a cellular transmission power level higher than a mobile device transmission power level at which the mobile device signal is transmitted.

44. An apparatus comprising:

a plurality of spatially separated antennas;

a receiver configured to receive, through the plurality of spatially separated antennas, a plurality of cellular signals from a plurality of base station interface circuits; and a transmitter configured to transmit a mobile device radio frequency signal including data extracted from the plurality of cellular signals, the transmitter configured to transmit the mobile device radio frequency signal to a mobile device moving relative to Earth while the apparatus is on a vehicle moving relative to the plurality of base station radio interface circuits and relative to Earth.

45. An apparatus in accordance with claim 44, wherein the plurality of cellular signals is a plurality of code division multiple access (CDMA) signals.

46. An apparatus in accordance with claim 44, wherein the plurality of spatially separated antennas is configured as directional antenna sectors.

47. An apparatus in accordance with claim 44, wherein the plurality of spatially separated antennas is configured as a plurality of phased array antennas with directional radio frequency beams.

48. An apparatus in accordance with claim 44, further comprising another plurality of spatially separated antennas, the transmitter configured to transmit the mobile device radio frequency signal through the another plurality of spatially separated antennas.

49. An apparatus in accordance with claim 44, further comprising a controller configured to align and combine the plurality of cellular signals.

50. An apparatus in accordance with claim 44, the transmitter further configured to transmit the mobile device radio frequency signal within time slots of time-division multiplex channels.

51. An apparatus in accordance with claim 44, wherein the transmitter is configured to transmit the mobile device radio frequency signal while the apparatus is moving in the same direction that the mobile device is moving.

52. An apparatus comprising:

a plurality of spatially separated antennas;

a first receiver configured to receive, through the plurality of spatially separated antennas, a cellular signal transmitted from a base station radio interface circuit;

a first transmitter configured to transmit a mobile device signal including data extracted from the cellular signal, the first transmitter configured to transmit the mobile device signal to a mobile device moving relative to Earth while the apparatus is on a vehicle moving relative to the base station radio interface circuit and in the same direction that the mobile device is moving;

a second receiver configured to receive another mobile device signal transmitted from the mobile device; and a second transmitter configured to transmit, through at least one of the plurality of spatially separated antennas, another cellular signal including other data extracted from the another mobile device signal, the second transmitter configured to transmit the another cellular signal to the base station radio interface circuit while the apparatus is on the vehicle moving relative to the base station radio interface circuit and relative to Earth.

53. An apparatus in accordance with claim 52, wherein the second transmitter is further configured to transmit the another cellular signal at a cellular transmission power level higher than a mobile device transmission power level at which the another mobile device signal is transmitted.

54. An apparatus in accordance claim 52, wherein the second transmitter is further configured to transmit the another cellular signal through at least two of the plurality of spatially separated antennas.

55. An apparatus in accordance with claim 52, wherein the cellular signal is a code division multiple access (CDMA) signal.

56. An apparatus comprising:

a first plurality of spatially separated antennas;

a second set of spatially separated antennas;
a first receiver configured to receive, through the first plurality of spatially separated antennas, a first plurality of cellular signals transmitted from a plurality of base station radio interface circuits;
a first transmitter configured to transmit, through the second plurality of spatially separated antennas, a first plurality of mobile device signals including first data extracted from each of the plurality of cellular signals, the first transmitter configured to transmit the first plurality of mobile device signals to a mobile device moving relative to Earth while the apparatus is on a vehicle moving relative to the base station radio interface circuits and in the same direction that the mobile device is moving;
a second receiver configured to receive, through the second plurality of spatially separated antennas, a second plurality of mobile device signals transmitted from the mobile device; and
a second transmitter configured to transmit, through the plurality of spatially separated antennas, a second plurality of cellular signals including second data extracted from each mobile device signal of the second plurality of mobile device signals, the second transmitter configured to transmit the second plurality of cellular signals to the plurality of base station radio interface circuits while the apparatus is on the vehicle moving relative to the base station and relative to Earth.

57. An apparatus in accordance with claim 56, wherein the first plurality of cellular signals and the second plurality of cellular signals are a plurality of code division multiple access (CDMA) signals.

58. An apparatus in accordance with claim 56, the second transmitter further configured to transmit the second plurality of cellular signals at a cellular transmission power level higher than a mobile device transmission power level of the second plurality of mobile device signals.

59. An apparatus comprising:
a plurality of spatially separated antennas;
a first receiver configured to receive, through the plurality of spatially separated antennas, a first plurality of cellular signals transmitted from a plurality of base station radio interface circuits;
a first transmitter configured to transmit a first mobile device signal including first data extracted from each of the plurality of cellular signals, the first transmitter configured to transmit the first mobile device signal to a mobile device moving relative to Earth while the apparatus is on a vehicle moving relative to the base station radio interface circuits and in the same direction that the mobile device is moving;
a second receiver configured to receive a second mobile device signal transmitted from the mobile device; and
a second transmitter configured to transmit, through the plurality of spatially separated antennas, a second plurality of cellular signals including second data extracted from the second mobile device signal, the second transmitter configured to transmit the second plurality of cellular signals to the plurality of base station radio interface circuits while the apparatus is on the vehicle moving relative to the base station radio interface circuits and relative to Earth.

60. An apparatus in accordance with claim 59, wherein the vehicle is overhead.

61. An apparatus in accordance with claim 59, wherein the first plurality of cellular signals and the second plurality of cellular signals are a plurality of code division multiple access (CDMA) signals.

62. An apparatus in accordance with claim 59, the second transmitter further configured to transmit the second plurality of cellular signals at a cellular transmission power level higher than a mobile device transmission power level at which the second mobile device signal is transmitted.

63. An apparatus comprising:
a plurality of spatially separated antennas;
a first radio interface circuit configured to receive, through the plurality of spatially separated antennas, a first plurality of cellular signals transmitted from a plurality of base station radio interface circuits and configured to transmit a second plurality of cellular signals to the plurality of base station radio interface circuits;
a second radio interface circuit configured to transmit a first mobile device signal including first data extracted from each cellular signal of the first plurality of cellular signals, the second radio interface circuit configured to transmit the first mobile device signal to a mobile device and configured to receive a second mobile device signal from the mobile device, the second plurality of cellular signals including second data extracted from the second mobile device signal, the mobile device moving relative to Earth while the apparatus is on a vehicle moving relative to the base station radio interface circuits, the vehicle moving in the same direction that the mobile device is moving.

64. An apparatus in accordance with claim 63, wherein the first plurality of cellular signals and the second plurality of cellular signals are a plurality of code division multiple access (CDMA) signals.

65. An apparatus in accordance with claim 63, the first radio interface circuit further configured to transmit the second plurality of cellular signals at a cellular transmission power level higher than a mobile device transmission power level at which the second mobile device signal is transmitted.

66. An apparatus comprising:
a plurality of spatially separated antennas;
a first radio interface circuit configured to receive, through the plurality of spatially separated antennas, a first plurality of code division multiple access (CDMA) cellular signals transmitted from a plurality of base station radio interface circuits and configured to transmit, at a cellular transmission power level, a second plurality of CDMA cellular signals to the plurality of base station radio interface circuits; and
a second radio interface circuit configured to transmit a first mobile device signal including first data extracted from each CDMA signal of the first plurality of CDMA cellular signals, the second radio interface configured to transmit the first mobile device signal to a mobile device and configured to receive a second mobile device signal transmitted from the mobile device at a mobile device transmission power level less than the cellular transmission power level, each CDMA signal of the second plurality of CDMA cellular signals including second data extracted from the second mobile device signal,
the mobile device moving relative to Earth while the apparatus is on a vehicle moving relative to the base station radio interface circuits, and
the vehicle moving in the same direction that the mobile device is moving.

67. An apparatus in accordance with claim 66, wherein the vehicle is overhead.

* * * * *